(No Model.)
F. G. BOTSFORD.
UNIVERSAL FLEXIBLE JOINT FOR PIPES.
No. 374,447. Patented Dec. 6, 1887.
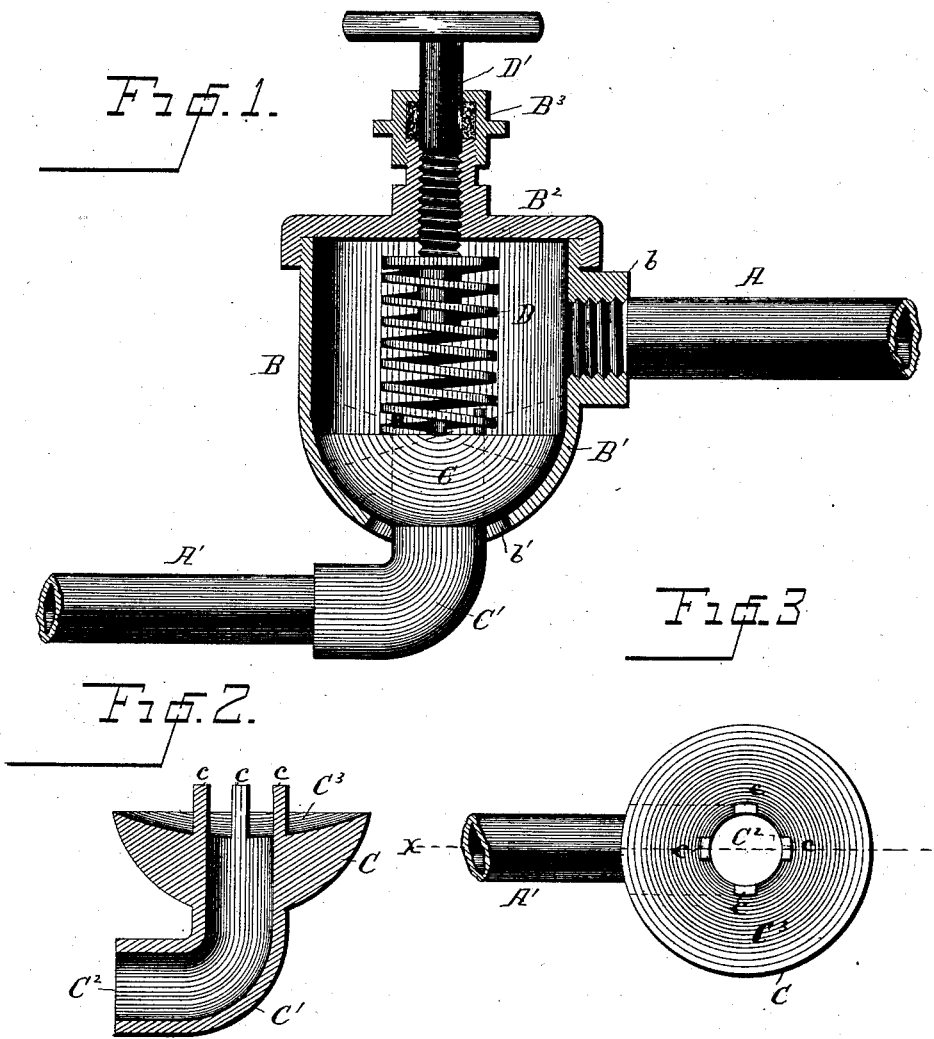
Witnesses
Wm A. Jones
Chas. ...
Inventor
F. G. Botsford
by Hallock & Hallock
Attys

UNITED STATES PATENT OFFICE.

FREDERICK G. BOTSFORD, OF ERIE, PENNSYLVANIA, ASSIGNOR OF ONE-HALF TO THOMAS D. VAN DEVORT, OF DUNKIRK, NEW YORK.

UNIVERSAL FLEXIBLE JOINT FOR PIPES.

SPECIFICATION forming part of Letters Patent No. 374,447, dated December 6, 1887.

Application filed August 27, 1887. Serial No. 248,052. (No model.)

*To all whom it may concern:*

Be it known that I, FREDERICK G. BOTSFORD, a citizen of the United States, residing at Erie, in the county of Erie and State of Pennsylvania, have invented certain new and useful Improvements in Universal Flexible Joints; and I do hereby declare the following to be a full, clear, and exact description of the invention, such as will enable others skilled in the art to which it appertains to make and use the same.

This invention relates to flexible joints for pipes; and it consists in certain improvements in the construction thereof, as will be hereinafter fully set forth, and pointed out in the claims.

My device is illustrated in the accompanying drawings as follows:

Figure 1 is a longitudinal vertical section with certain parts in elevation. Fig. 2 is a like section of the part C C' detached from the device. Fig. 3 is a top view of the part C C', together with the pipe A.

Letters of reference indicate parts as follows:

A A' are the two pipes connected by my joint.

B is the shell or box of the joint.

B' is the hemispherical socket or bottom of the shell B.

$B^2$ is the cap or cover of the shell.

$B^3$ is a stuffing-box in the cap $B^2$.

$b$ is the nipple of the shell B, into which the pipe A is screwed.

$b'$ is the opening in the bottom of the shell, through which the stem of the ball extends.

C is the ball of the joint.

C' is the neck or stem of the ball.

$C^2$ is the orifice or opening through the ball and stem.

$C^3$ is the concavity on the upper side of the ball.

$c\ c\ c\ c$ are lugs or fingers extending up from the upper mouth of the orifice $C^2$.

D is a spring for holding the ball C down in the socket B'.

D' is a screw for regulating the tension of the spring D.

X X in Fig. 3 is the line of section in Fig. 2, and the line of section in Fig. 1 is in the same plane.

I am aware that the ball-and-socket form is common in joints for pipes.

My invention consists in improvements in the details of construction.

The objects I seek to attain are, first, cheapness of construction; second, to secure a perfectly-tight joint under all conditions; and, third, perfect freedom of action in all directions under all conditions.

My device is specially intended for use on steam-pipes between railroad-cars; but it may be used to advantage on conduits for various purposes where a flexible joint is required.

The construction is as follows: The shell B, hemispherical bottom or socket B', and the nipple $b$ is a single integral casting, and so also is the hemispherical ball C and its stem C'. The stem C' is an elbow, so as to allow the pipe A' to extend in the same general plane as the pipe A occupies. The top of the ball C is concaved, as at $C^3$, so as to afford a recessed seat for the spring D, and also to give perfect drainage into the orifice $C^2$. The lugs or fingers $c\ c\ c\ c$ extend up inside of the spring D and prevent it from slipping on its seat when the ball is tipped into the positions shown by dotted lines in Fig. 1. The screw D' passes out of the shell through the stuffing-box $B^3$, and by it the tension of the spring can be perfectly regulated.

It will be observed that the parts B and C may expand or contract under varying conditions of temperature, and there will be no binding of one part upon the other, and the spring D will at all times maintain a tight joint between these parts.

What I claim as new is—

1. In a flexible joint for pipes, the combination of a shell, B, having a connecting-nipple, $b$, on one side and a socket, B', on opening $b'$ in the bottom, a hemispherical ball, C, having an elbowed stem, C', with orifice $C^2$, seated in said socket B', a spring, D, within said shell, seated on said ball, and a regulating-screw, D', extending out through the cap of said shell, substantially as and for the purpose set forth.

2. In a flexible joint for pipes, the combination of a shell, B, having a socket part, B', in its bottom, a connecting-nipple on its side, and a cap with stuffing-box on its top, a ball part, C, hemispherical in form and having an orifice, $C^2$, through its center, with lugs extending above its upper face and a stem, C', from its lower face, a seating-spring, D, within said shell, acting on said ball, and an adjusting-screw extending out through said stuffing-box, substantially as and for the purpose set forth.

In testimony whereof I affix my signature in presence of two witnesses.

FREDERICK G. BOTSFORD.

Witnesses:
WM. A. JONES,
A. R. GRAHAM.